(12) United States Patent
Briggs

(10) Patent No.: US 12,051,282 B2
(45) Date of Patent: *Jul. 30, 2024

(54) SYSTEM AND METHOD FOR CONDUCTING A PUBLICLY AUDITABLE ELECTION WITH SECRET BALLOTS

(71) Applicant: Carey Robert Briggs, Rancho Palos Verdes, CA (US)

(72) Inventor: Carey Robert Briggs, Rancho Palos Verdes, CA (US)

( * ) Notice: Subject to any disclaimer, the term of this patent is extended or adjusted under 35 U.S.C. 154(b) by 86 days.

This patent is subject to a terminal disclaimer.

(21) Appl. No.: 17/664,405

(22) Filed: May 21, 2022

(65) Prior Publication Data

US 2022/0375294 A1 Nov. 24, 2022

Related U.S. Application Data

(60) Provisional application No. 63/191,941, filed on May 22, 2021.

(51) Int. Cl.
*H04L 9/40* (2022.01)
*G07C 13/02* (2006.01)

(52) U.S. Cl.
CPC .......... *G07C 13/02* (2013.01); *H04L 63/0428* (2013.01)

(58) Field of Classification Search
CPC ............. G07C 13/02; H04L 63/0428

USPC ......................................... 235/386
See application file for complete search history.

(56) References Cited

U.S. PATENT DOCUMENTS

| | | | |
|---|---|---|---|
| 2001/0034640 A1* | 10/2001 | Chaum | G07C 13/00 705/12 |
| 2002/0007457 A1* | 1/2002 | Neff | H04L 9/3013 713/180 |
| 2012/0179514 A1* | 7/2012 | Cohen | G07C 13/00 705/12 |
| 2018/0102013 A1* | 4/2018 | Spanos | G06F 21/64 |
| 2020/0402073 A1* | 12/2020 | Tang | H04L 63/04 |
| 2023/0147564 A1* | 5/2023 | Briggs | H04L 9/0825 705/12 |

FOREIGN PATENT DOCUMENTS

EP 1469429 A1 * 10/2004 ......... G06Q 20/3674

* cited by examiner

*Primary Examiner* — Michael G Lee
*Assistant Examiner* — David Tardif

(57) ABSTRACT

The present invention comprises a system and method of conducting a publicly auditable election using secret ballots. The invention allows an elector to verify their ballot has been counted towards the result of an election in the manner in which it was cast. The elector is capable of cryptographically proving if their ballot has been altered or deleted. Any interested individual or entity is capable of auditing the election using an anonymized database of published ballots.

6 Claims, 9 Drawing Sheets

Real Ballot          Duress Ballot

REGION

CONTEST TITLE

Vote for no more than N

- ☐ Candidate 1 — Professional Title
- ☐ Candidate 2 — Professional Title
- ☐ Candidate 3 — Professional Title
- ☐ Candidate 4 — Professional Title
- ☐ Write-In Candidate
- ☐ Write-In Candidate
- ☐ Write-In Candidate — 303
- ☐ Write-In Candidate 301, 302

Review Ballots    Next ->

Figure 3

SYSTEM AND METHOD FOR CONDUCTING A PUBLICLY AUDITABLE ELECTION WITH SECRET BALLOTS

FIELD OF THE INVENTION

The present invention generally relates to information security. More particularly, the invention relates to secure elections which can be audited by any interested party while conforming to the secret ballot requirement.

BACKGROUND OF THE INVENTION

When discussing security in the design of an election system, 4 characteristics gain focus: Anonymity, severability, equity, and trust.

For an election system to be anonymous, no person shall be able to deduce how any elector voted. This is largely a check against intimidation and/or suppression of the vote. That is to say, an individual or entity hostile towards a candidate or policy cannot use completed ballots to search for electors who cast ballots for said candidate or policy (with the implied intent of retribution).

For an election system to be severable, no elector shall be capable of providing proof of how they voted (each ballot is severed from the elector). This is largely a check against bribery and coercion, similar to the Anonymity characteristic. Anonymity and severability, jointly, prevent bribery and coercion from being viable attack vectors against an election's integrity.

For an election system to be equitable, each elector must have exactly one counted vote according to their independent will, or zero if abstaining voluntarily. In the United States, law provides for equitable representation. No elector is afforded larger representation than any other elector at the ballot box, unless an elector voluntarily chooses to abstain from casting their ballot. Attacks against this characteristic commonly include destroying valid ballots or adding invalid ballots.

For an election system to be trustworthy, there must be a method by which any interested party can audit and verify the results of any election. Confidence in the propriety of an election must not require faith in other people.

One functional example of a secure election system is the traditional ballot box. A chosen box with a narrow slit in its top is demonstrated to be empty in plain view of the electorate. The box is then closed, and identical slips of paper are distributed to each member of the electorate. Each participating member then secretly marks a vote on their slip of paper and folds it, concealing the ballot from view. Each elector then inserts their paper into the ballot box through the slit at the top, in full view of the electorate. Once all electors have added their paper to the box, the box is shaken to mix the votes. The box is then opened and ballots are counted in plain view of the electorate. This method satisfies all four characteristics defined above.

One substantial shortcoming of the ballot box is its scalability. The ballot box process is only viable for an electorate small enough to satisfactorily observe the entire process. Contemporary elections routinely handle tens of thousands to millions of electors. As a result the process is parallelized and distributed. Ballots are transported from local polling stations to tabulation centers for counting. A large portion of the ballot process is conduced out of view of the electorate and locked within the source code of black-box computational devices. In contemporary election systems, one or more of the characteristics listed above are mutually exclusive. For example, no existing public election system is both severable and trustworthy. Once a ballot is surrendered, an elector has no provable means of verifying said ballot was counted accurately and fairly towards the results of an election. This is typically a result of the secret ballot requirement. There has been no known method of providing trustworthiness to an elector while maintaining a secret ballot.

Therefore, a need exists in the field for a novel method of conducting an election which provides an elector the ability to verify their own ballot has been counted accurately towards the results of the election without violating the requirement for a secret ballot. Further, a need exists for a method which opens the entire audit process to any interested party, thus removing the necessity for electors to have blind faith in the electoral process and those controlling it.

It is instructive to review ideal election system characteristics in reference to existing systems.

The anonymity requirement can be easily satisfied by not linking personally identifiable information to a ballot. For example, no elector's name is printed on said elector's ballot. This requirement is ballot-facing. Specifically—no person with access to the ballots can select a ballot and discern which elector cast said ballot. If an elector randomly chooses a unique number and writes said number on their ballot, then retains the only copy of said number as a form of receipt—the presence of the unique number cannot, on its own, be used to identify the elector who cast the ballot. Paper ballot systems typically satisfy this requirement as no identifiable information is retained on the ballot. Most deployed electronic ballot systems also satisfy this requirement. However, this requirement is currently violated by mail-in and absentee ballots-which necessarily must accompany identifiable information to be accepted as valid and legal.

The severability requirement is the elector-facing variant of anonymity. Given a pile of ballots, no elector can offer proof to a third party of which ballot they cast. The above example of a receipt would violate this requirement. Many electronic and paper ballots satisfy this requirement, since no elector retains information linked to a unique ballot. However, mail-in ballots violate this requirement by allowing ballots to be completed in the presence of third parties.

Significant challenges arise when enforcing equity. An election is a massive event requiring the cooperation of many workers distributed across vast geographic regions. Any one of these workers can accidentally or intentionally misplace or destroy ballots. A malicious actor can inject additional invalid ballots, or replace valid ballots with invalid ones. Voter ID laws can help to combat attacks on equity by electors, but they don't effectively prevent injection of illegal ballots by other malicious actors (e.g, dishonest poll workers or election software companies). Most ballots (paper and electronic) are highly susceptible to these kinds of attacks.

Finally, it is instructive to estimate what constitutes a system which requires no faith. For modern elections, it is impossible for every elector to observe the entirety of the chain of custody. When dealing with paper ballots, this leaves the vast majority of electors with no provable confidence in their ballot being accurately tallied. Further, even if a single elector observes the entire chain of custody of their individual ballot, no elector can be given reasonable evidence that equity is satisfied in general. All existing electronic systems similarly leave the elector with no reasonable evidence. A single bad actor can break equity.

Faith is difficult quality to evaluate due to its subjectivity. The traditional ballot box, itself a completely open process, still requires some minutia of faith. A talented magician could likely cheat the process. Even cryptography is not perfectly secure. Passwords can be guessed, rainbow tables computed, backdoors built, or worse—the mathematical foundations themselves could be found exploitable. Encryption is built upon what is believed to be sufficiently difficult problems. Cracking cryptography is merely difficult enough to inspire faith, as is evidenced by online banking or the trillion dollar Bitcoin market capitalization.

SUMMARY OF THE INVENTION

The present invention comprises a method of casting an electronic ballot in an election whereby an elector retains a token which can be used to identify said ballot within a database, without simultaneously retaining the ability to convince a third party of how said elector voted. Each elector in an election using the present method will cast two ballots. One ballot is real and designed to count toward the outcome of said election. The second ballot is considered to be made under duress, and is designed to not alter the outcome of said election. The elector chooses only one of the two ballots for which they will retain a token. There is no manner by which an entity other than the elector who generated the token could discern if said token represents a real or duress ballot. By retaining the token for a duress ballot, an elector could feign compliance with a coercive third party while still applying said elector's free will towards the outcome of an election. If an elector retains the token for their real ballot, the elector maintains the ability to verify the existence and validity of their ballot in a publicly released database after the election has concluded.

BRIEF DESCRIPTION OF DRAWINGS

Some embodiments of the present invention are illustrated as an example and are not limited to the figures of the accompanying drawings, in which like references may indicate similar elements and in which:

FIG. 3-FIG. 3 shows a preferred user interface presented to an elector when both the real and duress ballots are visible.

DETAILED DESCRIPTION OF THE INVENTION

Figure 1:
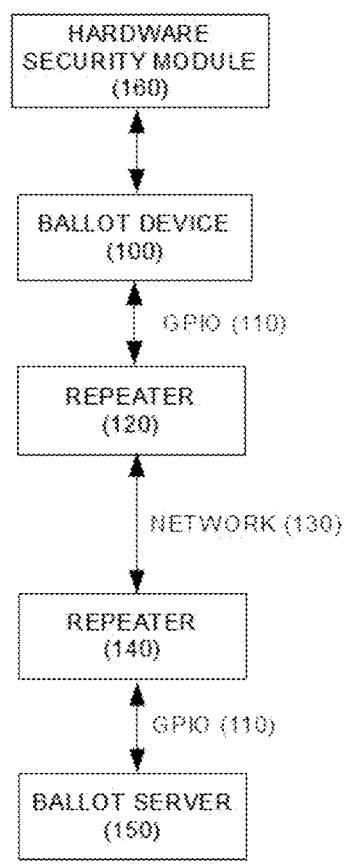
FIG. 1-FIG. 1 depicts the physical hardware connections between the system's computing devices in the preferred embodiment.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New election systems are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Digital signatures can provide proof of ownership with regard to strings of data which have been collated into a database. They also provide proof that said strings of data have not changed. This is perfect for digital ballots. An elector's ballot can be rendered into a pre-defined, plaintext format (XML, etc) and then signed by said elector's unique, ephemeral private key. The ballot plaintext, public key, and signature comprise the elector's ballot package. The elector then sends their ballot package to a central ballot server where it is validated and stored. At the conclusion of an electoral period, the collated database is released publicly for any interested party to compute the results of an election. Any interested elector could verify their ballot is included in the database by simply retaining their ballot signature and private signing key at the time of voting and search for it in the database. If the associated ballot plaintext matches the signature and key, the elector has some degree of proof their ballot hasn't changed from its casting.

Using cryptography in this manner satisfies only part of one characteristic of a secure election: Equity. It somewhat begins chipping away at the amount of faith required from an elector. By retaining a token, provided it can be shown to be unique, the elector can be certain their true vote is being counted toward the final tally. Their vote cannot be altered or destroyed without detection. Unfortunately, this method breaks a different requirement: Severability. We will return to the severability issue at a later time. For now, only half of equity has been solved.

A secure election system must also prevent unauthorized ballots from being added to the database (stuffing the box). The simplest solution to the remaining equity problem is requiring a biometric token from an elector before a ballot will be accepted for collation. Requiring a biometric token effectively ties a ballot to a body. A biometric seed is used to generate a unique public-private keypair associated with a particular human body. The public key is stored in a voter registration database. The private key is only used (and promptly discarded) when signing a piece of data (such as a challenge) to prove a previously authorized body is associated with a sanctioned action—such as casting a ballot in an election. This type of design prevents a third party from "stuffing the ballot" by requiring information for which a third party has no access. Further, even if a malicious actor has unrestricted access to the registration database, the nature of the key generation limits the number of entries said malicious actor can create and actually use. As an additional benefit, using biometrics side-steps the controversial issue of voterID since no state-issued materials need to be presented to vote—the elector's body serves as positive identification.

The described system would satisfy the equity requirement, so long as the method of biometric key generation can be enforced. If an attacker has unrestricted access to the voter registration database, and can run custom code to generate signed ballots with purported (but not actual) biometric keys, the ballot server will be unable to discern between legal ballots and stuffed ballots. Here, a Hardware Security Module (HSM) is useful. Authorized (white-listed) ballot machines can be manufactured, leveraging embedded HSM keys as proof of identity. The operating code for the ballot machine can be encrypted with the HSM (such as with LUKS on Linux) to help restrict access and tampering when deployed in the field. Any (electronic) ballot package arriving at the ballot server must be signed by a previously known and authorized HSM in order to be trusted as valid. Such a system can enforce biometric generation of cryptographic keys used for identification of electors. The HSMs and attached hardware must be available to third party audit to ensure no HSM has been added to the white-list which is not configured as an authentic ballot device. Such a whitelist must be published and publicly audited prior to and/or immediately after use for the electorate to maintain faith in the system.

Equity is not solely maintained in relationship between the ballot server and the elector, but also necessarily between electors. If an elector cries foul and insists a ballot has been deleted from the publicly released election results, all other electors must be capable of testing the claim. As the software for such a system must be open-source, any programmer could download the code to understand the data format and cryptographic functions used to generate ballots. Said programmer could then generate a ballot and signature on unsanctioned hardware with no HSM and falsely claim the ballot signature should be in the database. Enter: election authority signing keys. If the ballot server maintains a signing keypair, and releases the public key before an election, the server can use the keypair to sign ballot signatures which have been legitimately submitted. In doing so, a third party can test deletion allegations by checking if the retained ballot signature has itself been signed by the election authority. A ballot signature, further signed by the ballot server, is herein referred to as a ballot receipt. It serves as proof to any party that a ballot with a specific signature has been received by the collation server and must be present in the publicly auditable database released at the conclusion of any election.

In situations where ballot devices must remain entirely isolated from all networking, a hardware security device signature may suffice in place of a ballot server signature.

It appears there is a dichotomy between the severability and trust requirements. To be severable, the system cannot be trustworthy. To be trustworthy, the system cannot be severable. However, the severability requirement arises from the need to prevent coercion. This isn't a limitation on the elector, but on a third party to the elector. It's perfectly acceptable for an elector to prove to him or her self how said elector voted. What must be avoided is the elector's ability to convince a third party of how their ballot was cast. One needs only inject doubt into the system. Specifically, not a doubt to the elector, but to any third party to the elector.

When an elector retains a token linked to a ballot in a publicly available database, it opens the possibility of coercion. A malicious actor with power over an elector could force said elector to surrender their receipt, thus providing evidence of how the elector cast their ballot. Similarly, an elector promised benefits for casting a ballot in a certain manner can prove they complied for reward. One solution to this problem is offering an elector under coercion the ability to manufacture a token for an inconsequential ballot which has been cast in the manner which a malicious actor directs. This requires a definition of inconsequential: a ballot for which one or more negating ballots have been recorded. Inconsequential ballots may change the final vote tallies, but not the ranking of candidates or the absolute margins of victory. Herein, we refer to these ballots as duress ballots. Duress ballots somewhat complicate the validation process by requiring proof that the ballot server hasn't swapped the status of the real and duress ballots (addressed later).

In the proposed system, an elector is presented with the option of casting two ballots. One is a real ballot designed to count toward the final vote tally. The other is a duress ballot designed to not alter the final outcome. Nothing additional need be done for a real ballot, aside from mark it as such in a non-public database. However, duress ballots need to be inconsequential and therefore require balancing. When a duress ballot is received by the server, it is stored and marked as duress. At the close of an election, the vote total for all duress ballots is tallied by the server and extra duress ballots are added by the server to balance the duress votes evenly per contest. While this process does inflate the vote total, it preserves the absolute margins. An audit on the original database must show that all duress ballots sum to a tie for all contests.

When a duress ballot is cast, a receipt must be tendered to the elector in the same manner as a real ballot. However, if both receipts are offered to the elector, a malicious actor could simply demand both receipts from the elector. This necessitates an elector to choose only one receipt. When under duress, the elector selects the duress receipt and loses the ability to personally audit their real ballot in the published database. In this way, there is no method by which a malicious actor could determine whether a receipt surrendered represented a real or duress ballot, but there is no doubt to the elector which receipt was retained. The trust/severability dichotomy is resolved.

There is a simple attack which arises from retaining a token associated with a ballot. A coercive actor familiar with the proposed system would understand an elector can cast two ballots but can only receive a receipt for one. Most ballots are required to allow an elector to write in the names of candidates who have not been previously defined. The write-in field is largely unconstrained in its input. A coercive actor could demand an elector under duress to write an agreed-upon string into one or more write-in fields of an inconsequential contest. Supposing this string is unique, the coercive actor could then search the published database of votes after an election to find the ballots containing the unique strings. The constraint of a single receipt has thus been circumvented. One effective strategy for preventing this method of attack is by splitting up a single ballot into two: one part containing predefined candidates and the other containing only the write-in data. This isolates elector defined input from predefined input and limits the ability of an attacker to subvert the single receipt constraint.

Incorporating duress ballots into a system also opens an attack vector from the perspective of the server. If, when casting a real ballot, only a real ballot is submitted, a server-side attacker can be certain the elector is requesting a receipt for the real ballot. However, if a duress ballot accompanies the real ballot, the attacker may be able to discern that the elector will necessarily request a duress receipt rather than the real receipt. In such a case, the server may be able to alter a real ballot without detection (provided the HSMs have somehow been circumvented). To protect against this attack it is necessary to accompany a duress ballot with every real ballot, whether a duress receipt is desired, or even a duress ballot elector-generated. The process can be simplified by generating a random duress ballot for an elector should the elector not request one, or simply allow an elector to fill out a duress ballot despite not desiring the linked receipt. Since each elector always sends a real and duress ballot as a pair, the server cannot determine which receipt the elector will retain for audit. Changing a real ballot then carries significant risk of detection.

The present invention will now be described by referencing the appended figures representing preferred embodiments.

FIG. 1 is a diagram schematically illustrating the connection between relevant machines in an embodiment of the present invention. A ballot device 100 allows a user to register their preferences in an election and encodes it into a standardized format. The ballot device 100 must transmit and receive data from a remote ballot server 150 which authenticates an elector's identity, keeps record of the contests in which an elector may participate, and stores an elector's completed ballots. The network 130 through which the ballot device 100 must communicate is considered to be hostile and not secure. As such, the ballot device 100 is isolated from the network 130 by using a repeater 120. The repeater 120 is connected to the ballot device 100 through a GPIO 110 or other similarly constrained instruction set which prevents network users from attempting to log in to the ballot device 100 or otherwise send it insecure commands.

Figure 4:
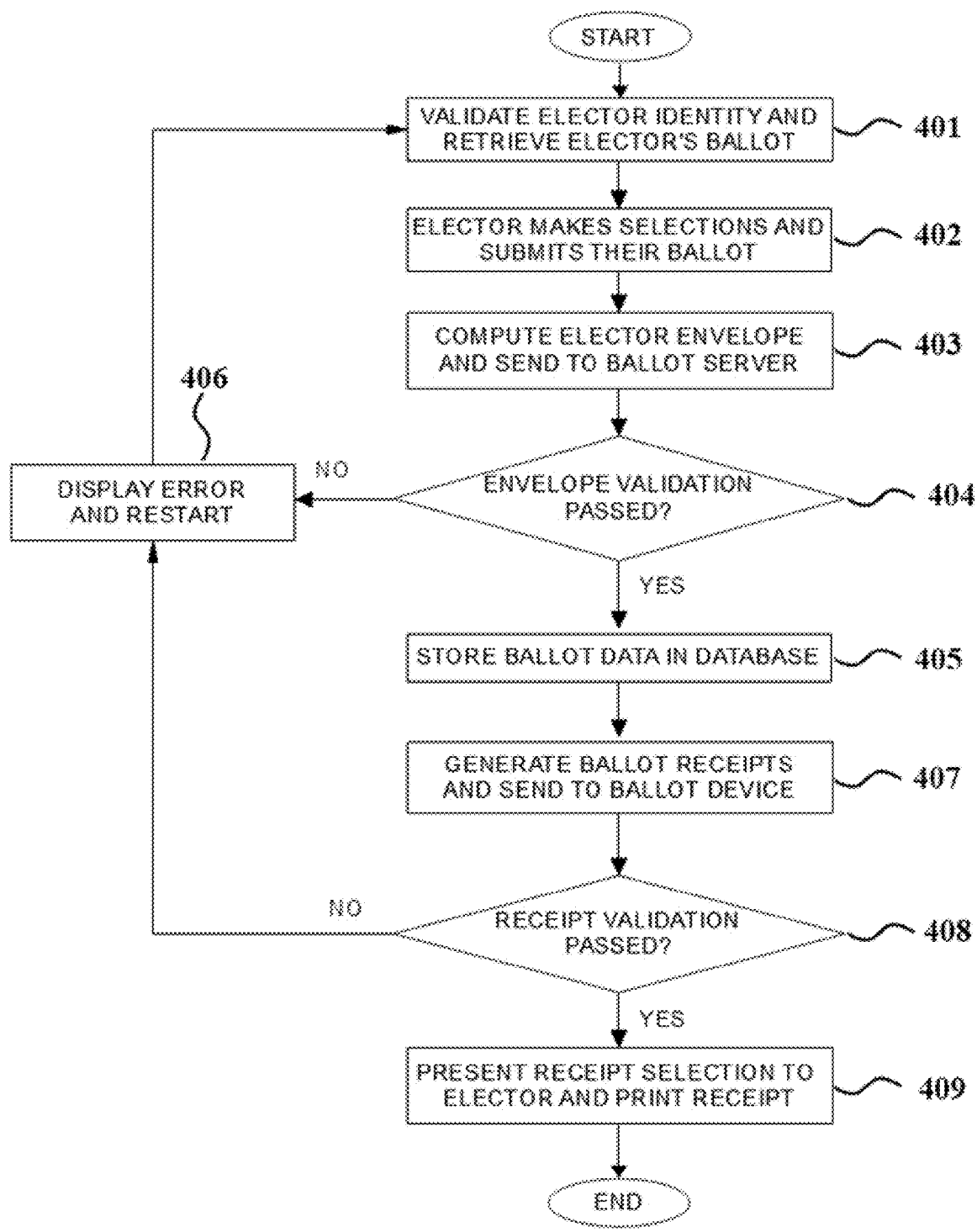
FIG. 4-FIG. 4 illustrates the preferred embodiment of the ballot casting method.

The process of casting a ballot is depicted in FIG. 4. The process begins with 401 validating an elector's identity and eligibility to participate in an open election. An elector presents an identification token to the ballot device 100. According to the present invention, the identification token is a biometric input which is used to generate a signing keypair. In the absence of a biometric input, the identification token could alternatively be a crpytographic signing keypair in machine readable format which was physically mailed to the registered address of said elector.

The ballot device 100 generates an authentication/ballot retrieval query containing the elector's public signing key, further signed by the hardware security module (HSM) 160.

The authentication query is sent across a GPIO bus 110 to a repeater 120. The repeater 120 sends the encrypted authentication inquiry across a network 130 to a remote repeater 140 which relays the inquiry to a ballot server 150. The ballot server 150 extracts the elector's public signing key from the inquiry and verifies the elector is eligible to vote in the open election. The ballot server 150 retrieves region-specific ballot information for the elector and returns it to the ballot device 100 as an answer to the authentication inquiry. If the elector is not authorized to vote in the present election, an error is instead returned.

The ballot device 100 generates the elector's ballot and presents it to the elector using a touch screen.

Figure 2:
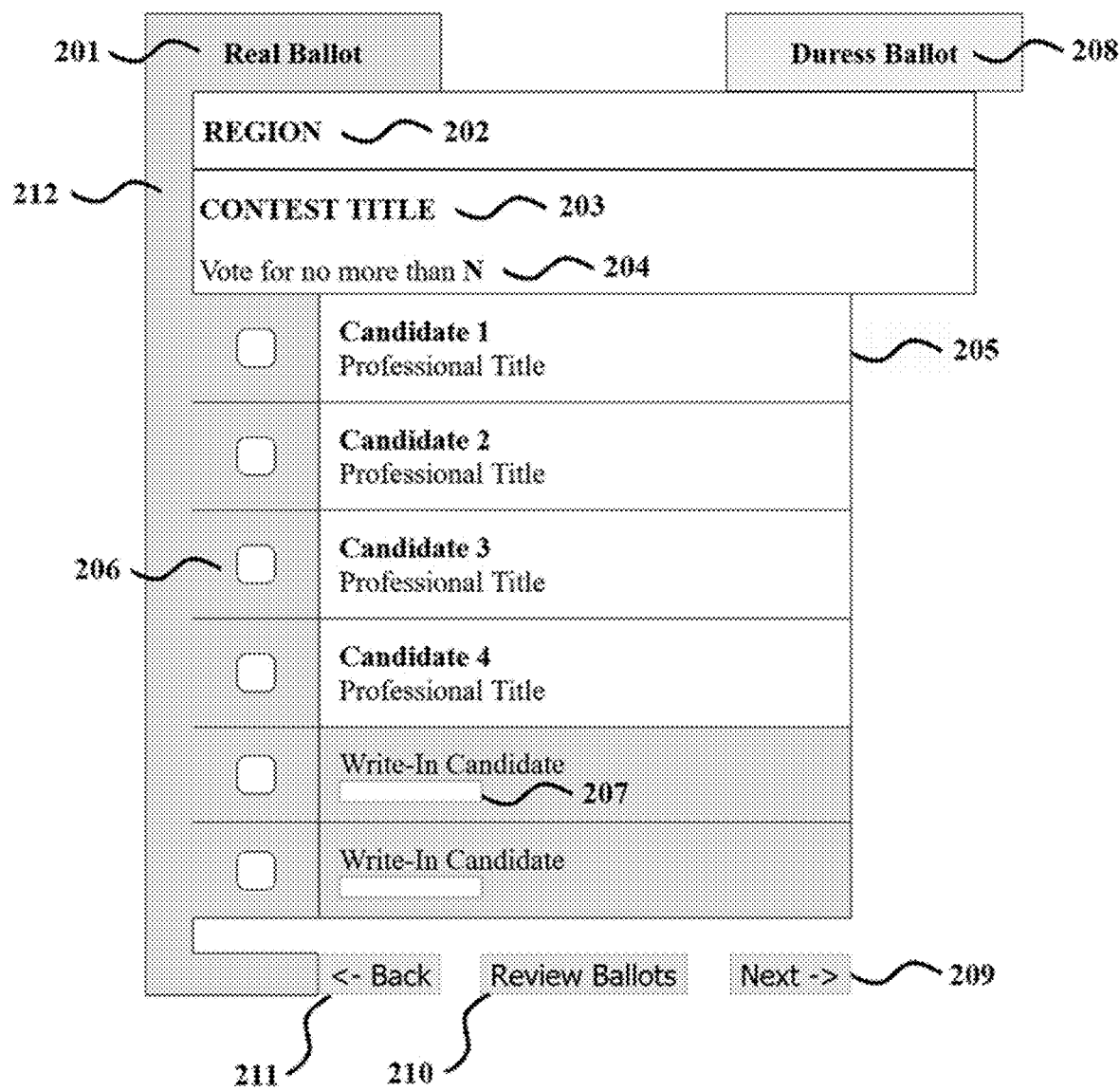
FIG. 2-FIG. 2 shows a preferred user interface presented to an elector in order to register real ballot preferences.

FIG. 2 depicts the preferred method of presenting a ballot to an elector when only the real elector ballot is visible. A region of continuous color 212 connects the real ballot header 201 with the real ballot options 206. A clickable header 208 can be used to show or hide the duress ballot options, which are hidden by default. 202 indicates a region for a particular contest: such as City, District, State, or National. 203 indicates the contest name for which the options are presented. 204 indicates how many options, maximum, an elector may select concurrently from those presented. 205 lists the options or candidates associated with the contest. 206 indicates a checkbox that can be selected or unselected for the associated option or candidate. 207 indicates a text input an elector can use to supply a candidate name that is not pre-defined. 209 depicts a button the elector can use to save their choices and view the next contest. 211 depicts a button the elector can use to return to a previous contest. 210 depicts a button the elector can use to review all of their selected ballot options in preparation to generating plaintext and submitting their ballots.

FIG. 3 depicts the ballot presented to an elector when the duress options are visible. A continuous region of color 301, distinct from the real ballot color 212, joins the duress ballot header 208 and the duress options 302 and 303.

In step 402, an elector uses a touch-screen or other input device to navigate the ballot contests and register their preferences using the real ballot inputs 206 and 207. If the elector is under duress, said elector can expand the duress ballot by clicking the duress header 208. Said elector can then register the coerced options using the duress ballot inputs 302 and 303.

Figure 5:
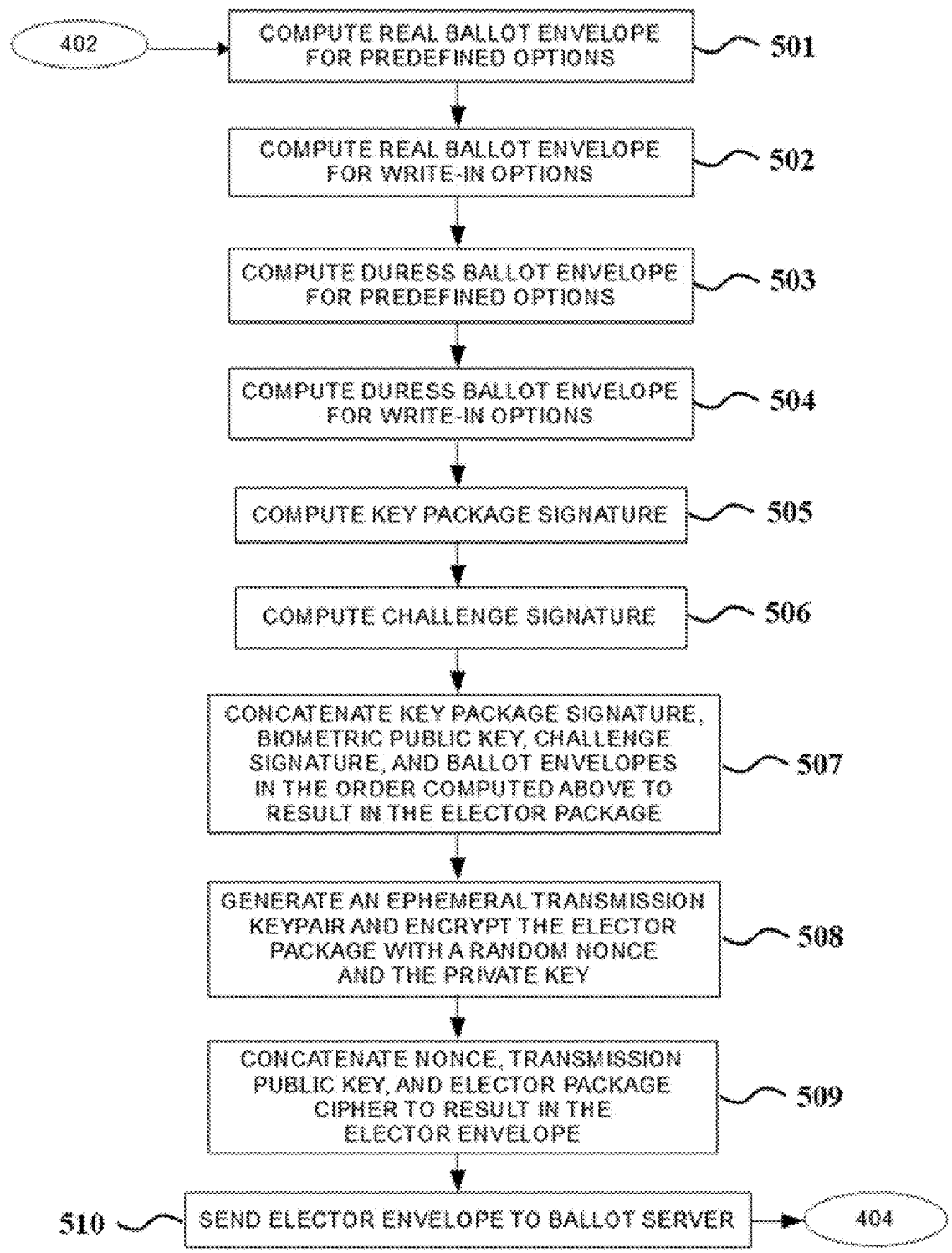
FIG. 5-FIG. 5 expands step 403 in greater detail.

The ballot device processes the elector's ballots in step 403, which is expanded in detail in FIG. 5. Each step 501, 502, 503 and 504 repeats the same process detailed in FIG. 6 using different input data.

For step 601, the ballot device 100 computes a ballot plaintext for the real ballot's pre-defined candidates and options. According to the preferred embodiment, the elector's selected pre-defined candidates and options for each contest are rendered into an XML file 704. For pre-defined candidates, the candidate or initiative names are included in the XML to discourage the ballot server 150 from swapping indices of running candidates. Step 602 generates a one-time-use signing keypair, the public key of which is 702. 603 hashes the ballot XML (e.g, with sha-512). The resultant hash is signed in step 604 using the keypair generated in 602, resulting in the elector's ballot hash signature 703. The elector's public signing key 702, ballot hash signature 703, and ballot XML 704 are concatenated and preceded by the computed length of the concatenation 701. The resulting concatenation constitutes the Ballot Package 705. The ballot package is hashed and this hash is signed by the HSM 160, resulting in the signed ballot package hash 707. The HSM public key 706, signed ballot package hash 707 and the ballot package 705 are concatenated, resulting in the ballot envelope 708 for the real, pre-defined ballot options.

Figure 6:
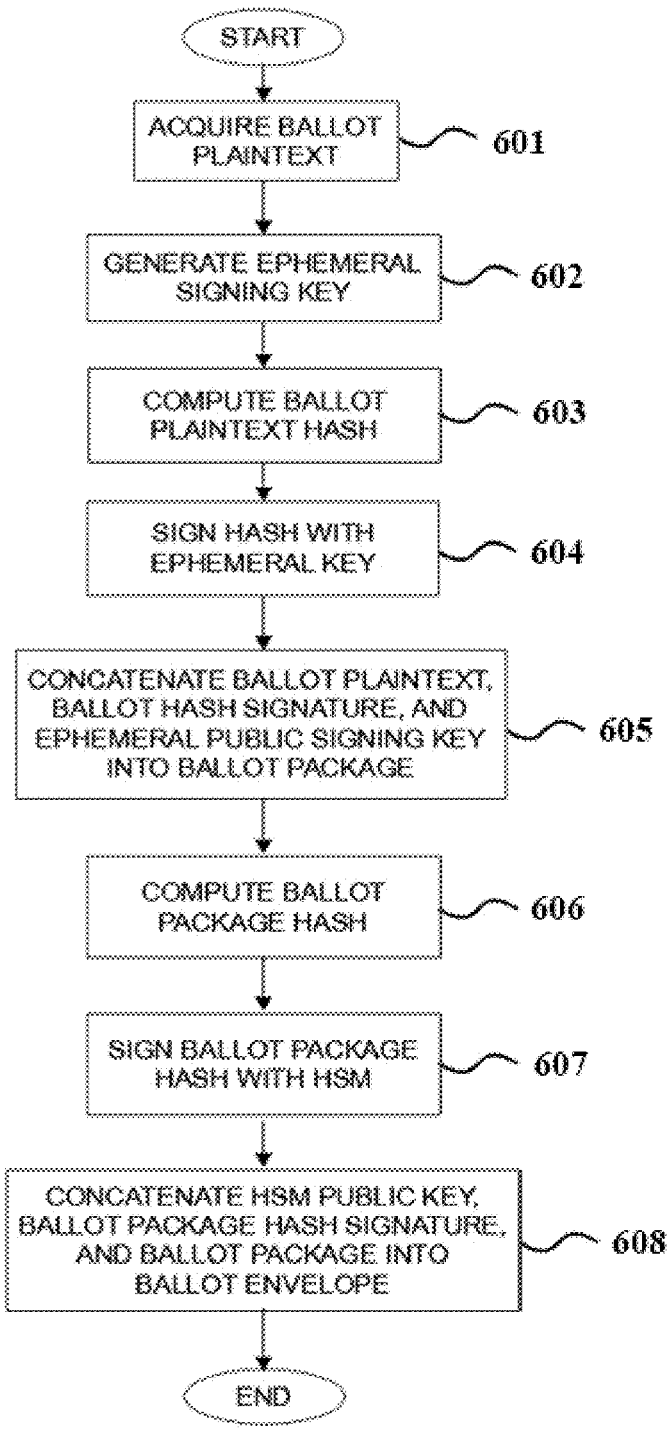
FIG. 6-FIG. 6 expands the process of 501 in greater detail. Process 501, 502, 503 and 504 are identical methods, distinct only in their differing inputs.
Figure 7:
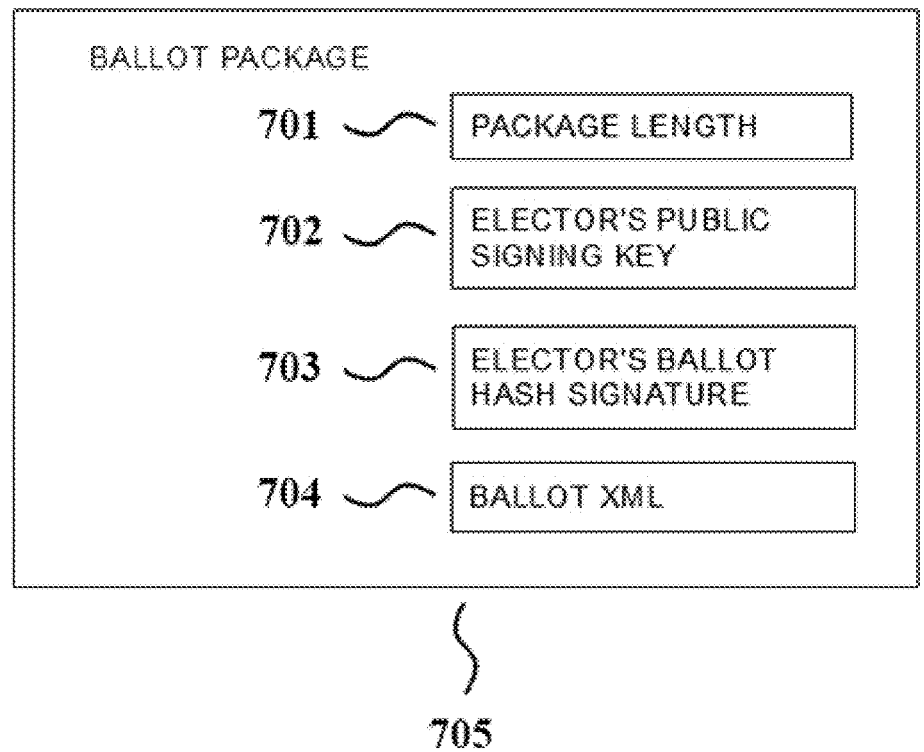
FIG. 7-FIG. 7 depicts the preferred embodiment of the data structure for a single ballot.
Figure 7:
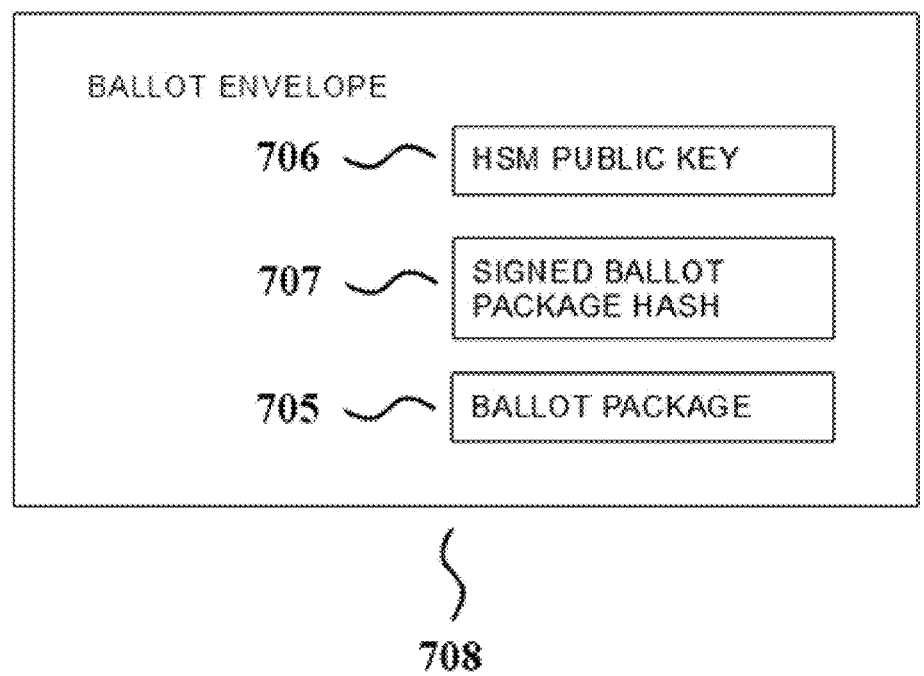
Figure 8:
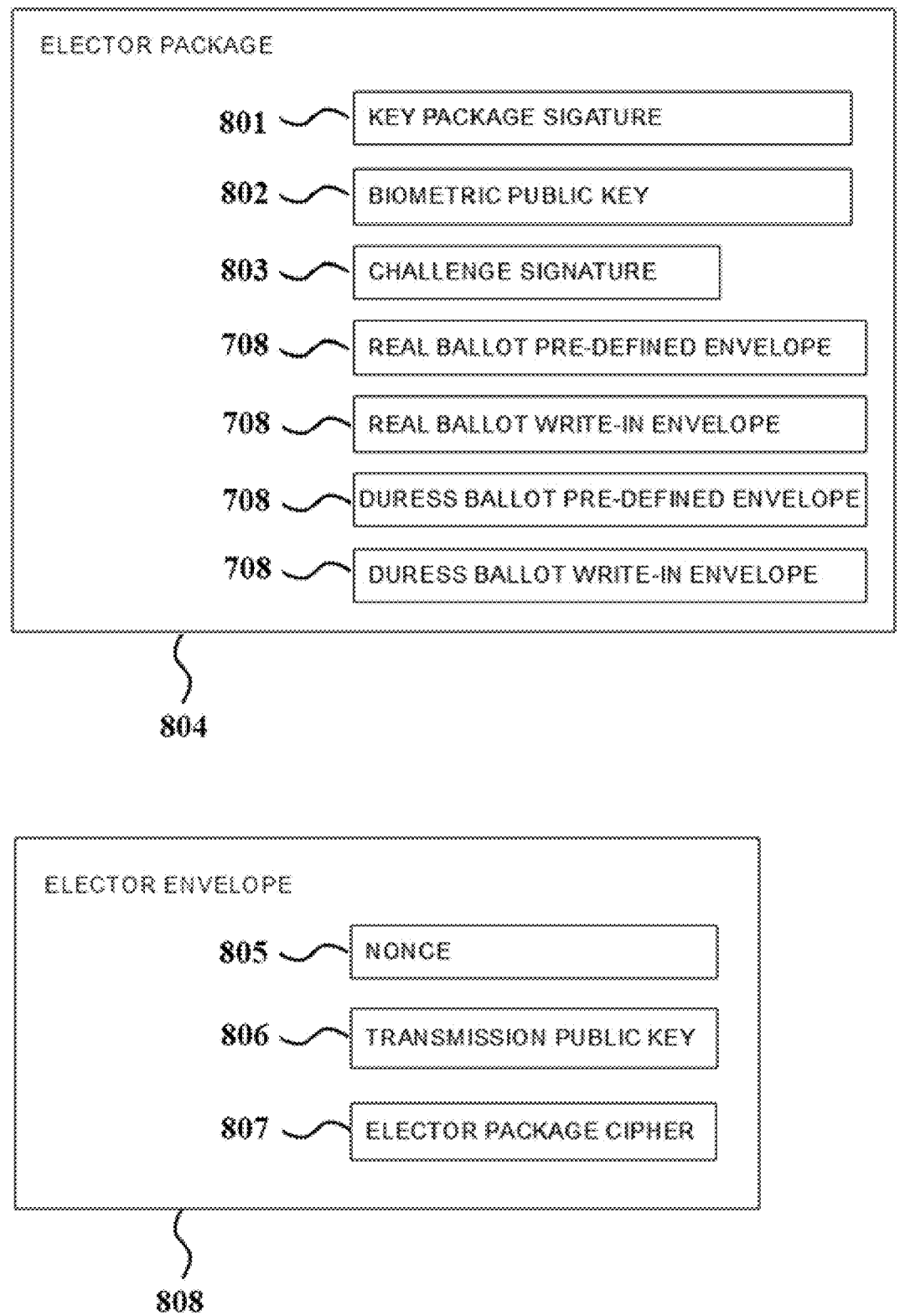
FIG. 8-FIG. 8 depicts the preferred embodiment of the data structure for all 4 of an elector's ballots, encrypted and prepared for transmission.

The process described in FIG. 6 is then repeated for the write-in component of the real ballot in 502, the pre-defined options for the duress ballot in 503, and the write-in portion of the duress ballot in 504. Each of the 4 ballot envelopes are generated using unique elector signing keypairs.

The elector's public signing keys 702 are concatenated in the specific order: real pre-defined options key, real write-in options key, duress pre-defined options key, duress pre-defined write-in key. The concatenation is hashed and the hash signed by the HSM 160 resulting in the key package signature 801. These ballots must also be accompanied by the valid biometrically derived (or mailed) public signing key from the elector that was included in the authentication query of step 401. After generating the biometric keypair, challenge data is signed by the private biometric key. The challenge data could be the current datetime string, or a string sent by the ballot server itself as a response to the authentication query. The signed challenge data is further signed by the HSM 160, resulting in the challenge signature 803. The key package signature 801, concatenated with the public biometric key 802, the challenge signature 803, and each of the ballot envelopes (in the order used to generate the key package signature 801) comprises the elector package 804.

The requirement of data signed by the ballot server (namely, the ballot receipt) forces a situation where the elector's package 804 must be sent over a presumed hostile network 130 in real-time, such that the elector may acquire and retain the receipt at the time of casting the ballot. In preparation for this, the ballot machine must encrypt the envelope 804 such that it cannot be read by a man-in-the-middle. An ephemeral "transmission" keypair and nonce are generated to encrypt the elector ballot, resulting in the elector package cipher 807. This cipher is concatenated with the transmission public key 806 and the used nonce 805, resulting in the final elector envelope 808, which will be sent to the ballot server.

It is universally undesirable to connect sensitive computational devices to a network-especially an untrusted network such as the internet. But the ballot machines are required to transmit a packet of information across the internet to a server, and expect a response. Fortunately, this does not require a network connection and can be accomplished on hardware devoid of traditional networking capabilities. A ballot machine (a secure device) can be connected to a network-facing, insecure device through a custom chip interface. Alternatively, general-purpose 10 pins can be driven by purpose-specific software. Data can be transferred across these pins by setting the voltage high or low, and reading the pin voltage on the connected device. This is informally known as bit-banging. Tightly controlling access to and parsing of the data transmitted across the GPIO restricts the ability of an attacker to compromise the system, with the network-facing device acting as a firewall. The elector envelope can therefore be securely bit-banged across a GPIO bus to the (presumed insecure) network-facing device, without any other data being capable of passing through (such as login attempts). Once the elector envelope is sent, the ballot machine waits for the ballot server's response.

Once received by the ballot server 150, the elector envelope 808 is validated in step 404. The elector package cipher 807 is decrypted, and the key package signature 801 is extracted and set aside. The biometric public key 802 is checked against a whitelist of legal electors, and the package is rejected 406 if the key is not found. The challenge signature 803 is confirmed to be linked to the public biometric key 802 and correctly signed. The ballot envelopes 708 are separated and each validated in turn.

The ballot package 705 is separated and hashed, and that hash is checked against the signed ballot package hash 707 and the HSM public key 706. Unsigning 707 with 706 should equal the hash of 705. If the signature is valid, the HSM public key 706 is checked against a whitelist. If the key exists in the whitelist, the ballot package is confirmed to have come from a trusted machine 110 and therefore represents a ballot cast by an actual elector. Within the ballot package 705, the ballot XML 704 is hashed and checked against the elector's public signing key 702 and electors ballot hash signature 703. If valid, the signature proves the ballot XML hasn't changed from the elector's casting. Due to the HSM being paired to a ballot machine, and all of an electors submitted ballots being generated at once from one machine, all machine public keys must obviously match for the 4 ballot envelopes. Any error or failure of validation in these steps results in 406 an error message being returned to the ballot device.

With all ballot envelopes validated, the key package is now checked. The elector public signing keys 702 are concatenated (in order) and the resulting bytes hashed. The hash is checked against the key package signature 801 and HSM public key 706. If not valid, the package is rejected 406. The key package signature 801 for an elector must be stored in association with the respective elector public signing keys 702. Doing so prevents the server software from swapping the duress status of the received ballots, since the order of ballots in the elector package is always: real pre-defined, real write-in, duress pre-defined, duress write-in. If the server swapped the duress status, then concatenating the associated elector keys in the expected order and hashing them would no longer match the linked key package signature 801. The key package signature cannot be replaced by the server since the key package must be signed by a whitelisted HSM to be valid. The key package signatures are stored separately from the rest of the ballot data to prevent accidental public release. With all checks complete, the ballot data is stored 405 in the ballot database and receipts are generated 407.

For each ballot package received, the elector's ballot hash signature 703 is signed by the ballot server 150. A server-signed elector ballot hash signature is defined as a ballot receipt. The four ballot receipts are concatenated in the same order as the ballots were sent: Real pre-defined, real write-in, duress predefined, duress write-in. The concatenated ballots are encrypted for transport and returned to the respective ballot machine for validation 408.

The ballot machine's network-facing device 120 receives the receipt cipher and bit-bangs 110 it back to the ballot device. The ballot device 100 decodes the cipher and checks that each receipt, when unsigned by the election signing key, matches the respective ballot hash signature 703. If all four are valid, the ballot machine prompts the elector to select a receipt pair: the real ballot receipts or the duress ballot receipts. After selecting one, the machine prints 409 the selected receipts on a sheet of paper (such as a Point-Of-Sale receipt generator), preferably in machine-readable format (such as QR code). The elector can then exit their session, destroying all user variables and returning the ballot machine to a welcome screen (prompting for biometric sign-in).

At the close of an election, the duress ballots must be balanced for each contest in the election. Duress votes for each candidate in each contest are tallied. The ballot server then adds supplemental "balancing" ballots to the database until the summation of duress and balancing ballots are equal for all candidates in a particular contest, thus rendering the duress ballots inconsequential to the results of the election. The balancing ballots are obvious to any auditor since the ballot server has no access to a white-listed HSM to sign the ballots. In an alternate embodiment, the ballot server can be issued a whitelisted HSM such that it can sign balancing ballots added to the database, rendering balancing and duress ballots indistinguishable from a public audit perspective. In such an embodiment, a private auditor would still be capable of determining the balancing status of ballots.

Once all duress ballots have been balanced, all databases are released with the exception of the key package groups and signatures. This allows all interested parties to audit their own receipts. While services and apps can be set up to help computer illiterate electors to scan and check their votes, a completely transparent audit necessitates auditors who program their own software to perform cryptographic checks against the released databases. Vote totals and contest winners can be computed by any interested party by inspecting the released databases.

An auditor acquires the completed and official ballot database from the entity running the election. This could be through county website, the election company's FTP server, or a trusted peer-to-peer interface such as a signed torrent.

Figure 9:
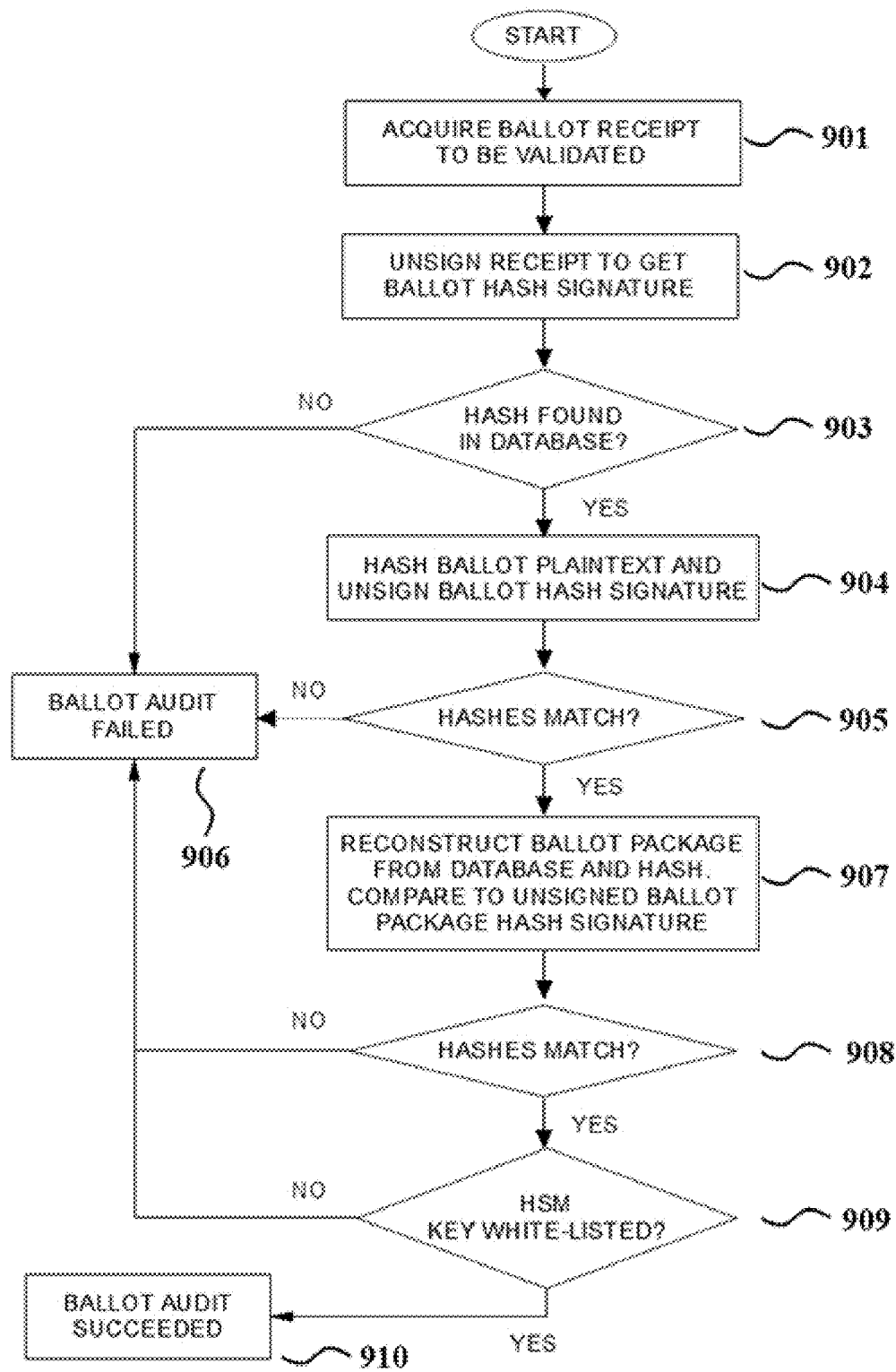
FIG. 9-FIG. 9 illustrates the process for performing an audit on the ballot database after an election has closed.

The ballot audit process is detailed in FIG. 9. For an acquired paper ballot receipt, the machine readable code is scanned and unpacked 901 to bytes. The ballot receipt is unsigned 902 using the election public signing key. This results in the original ballot hash signature received by the server. The ballot hash signature is searched for 903 in the database. If missing, the audit fails 906 and the receipt should be reported to election officials and the county government.

If the elector owning the ballot receipt is present, the associated ballot plaintext should be reviewed by the elector for accuracy. If the ballot plaintext doesn't match the elector's choices at the ballot machine, the ballot audit similarly fails.

The ballot plaintext is hashed and checked 904 against the ballot hash signature. Unsigning the ballot hash signature with the associated elector's public key should result in a matching hash. If the hashes don't match in 905, the audit process fails 906. The ballot package is then reconstructed 907 by concatenating the elector's public signing key, the elector's ballot hash signature, the ballot plaintext, and the length of the resulting concatenation (the length being placed at the beginning). The package is hashed and compared 908 to the un-signed ballot package hash signature (having been un-signed with the associated HSM key 706). If the hashes don't match in 908, the audit process fails 906. The associated HSM key 706 is checked 909 against the HSM whitelist released before the start of the election to ensure it is a legal key. If the key doesn't exist in the whitelist, the audit process fails 906. If the HSM key is found, the ballot audit has succeeded 910.

The ballot database itself can be audited in full without requiring a paper ballot receipt. The paper ballot receipt allows an elector to retrieve and audit their ballot, with the additional step of confirming that the ballot plaintext matches their selections cast at the ballot machine. Performing a general audit obviously loses that extra plaintext confirmation, but the cryptography and HSM usage constrains bad actors from tampering with the ballot data. For a general audit, the process outlined in FIG. 9 is performed on every ballot entry present in the database.

The data stored in the ballot database necessarily includes information regarding which ballots are real and which are duress. Obviously, this information cannot be publicly released, or the severability requirement is once again broken. This creates a parallel audit process whereby the public-facing election data can be audited by any member of the public, but the private election data (key packages and signatures) must be audited in a controlled environment where the private data may not be removed from a secure computing device. The individuals performing a private audit need not be carefully controlled, as the process should ideally be open to any interested party. Obviously, time and other resources will necessarily limit the availability of a private audit to fewer individuals than all interested. However, a private audit must ensure that no unauthorized devices are connected to the secure device hosting the key package signatures, nor is any information regarding the key packages leaked from the secure environment. Code necessary to perform a key package audit should already exist on the secure machine, and shall be written in a scripting language such that any auditor can confidently inspect the code performing the audit.

A private audit should ensure that all duress ballots have been properly balanced such that no candidate has been given advantage. The summation of balancing ballots and duress ballots should be verified to result in a tie for all candidates in all contests. Further, the order of signatures for duress and real ballots associated with all key package signatures should be validated to ensure the ballot collation software has appropriately handled the duress status of all ballots. This is done by concatenating the elector public signing keys 701 in the aforementioned order, then hashing the resultant concatenation. The resultant hash should equal the unsigned key package signature.

The invention claimed is:

1. A method of conducting a publicly auditable election comprising:
    converting an elector's completed ballot selections into a predefined format;
    computing a first digital signature by digitally signing said formatted ballot selections with a single asymmetric key pair, the private key of said asymmetric key pair being retained by the elector, and the first digital signature and public key of said key pair being openly published;
    computing a second digital signature by digitally signing, using a cryptographic module, the first digital signature with a second asymmetric key pair, the private key of said second key pair being securely stored on said cryptographic module; and
    transmitting to the elector the second digital signature.

2. The method of claim 1 wherein transmitting to the elector includes printing a machine-readable code containing the data to be transmitted.

3. A system to conduct a publicly auditable election comprising:
    at least one computing device configured to:
        convert an elector's completed ballot selections into a predefined format;
        compute a first digital signature by digitally signing said formatted ballot selections with a single asymmetric key pair;
        send to a cryptographic module the first digital signature;

receive from the cryptographic module a second digital signature which was computed from the first digital signature; and transmit to the elector the second digital signature;

a cryptographic module configured to:

receive input data to be digitally signed;

compute the second digital signature by digitally signing said input data with an asymmetric key pair, the private key of said key pair being securely stored on said cryptographic module; and return the second digital signature.

4. The system of claim 3 wherein transmitting to the elector includes printing a machine-readable code containing the data to be transmitted.

5. A method of conducting a publicly auditable election comprising:

converting an elector's completed ballot selections into a predefined format;

computing a first digital signature by digitally signing said formatted ballot selections with a single asymmetric key pair, the private key of said asymmetric key pair being retained by the elector, and the first digital signature and public key of said key pair being openly published;

transmitting to a server the formatted ballot selections, the first digital signature, and the public key of said asymmetric key pair;

computing a second digital signature by digitally signing the first digital signature with the private key of a second asymmetric key pair, the private key of said second asymmetric key pair being kept secret by an authority conducting the election; and transmitting the second digital signature to the elector.

6. A system to conduct a publicly auditable election comprising:

at least one computing device configured to:

convert an elector's completed ballot selections into a predefined format;

compute a first digital signature by digitally signing said formatted ballot a single asymmetric key pair, the first digital signature and public key of said key pair being openly published; and transmit to a server the formatted ballot selections, the first digital signature, and the public key of said asymmetric key pair;

a server configured to:

compute a second digital signature by digitally signing the first digital signature with the private key of a second asymmetric key pair; and transmit the second digital signature to the elector.

* * * * *